United States Patent [19]

Roczniak et al.

[11] Patent Number: 5,045,242

[45] Date of Patent: Sep. 3, 1991

[54] REMOVAL OF CHOLESTEROL FROM EDIBLE FATS

[76] Inventors: Steven Roczniak, 1400 Village Ct., Buffalo Grove, Ill. 60089; John B. Hill, 17819 Garden Valey, Woodstock, Ill. 60098; Robert A. Erickson, 266 S. Warrington, Des Plaines, Ill. 60016

[21] Appl. No.: 463,588

[22] Filed: Jan. 11, 1990

[51] Int. Cl.$^5$ ............................................... C11B 3/04
[52] U.S. Cl. ................................................. 260/424
[58] Field of Search ...................................... 260/424

[56] References Cited

U.S. PATENT DOCUMENTS 4,411,916  10/1983  Mann ................................... 426/43

FOREIGN PATENT DOCUMENTS

| 0174848 | 3/1986 | European Pat. Off. |
| 0256911 | 2/1988 | European Pat. Off. |
| 318326 | 5/1989 | European Pat. Off. ............ 260/424 |
| 60-18375 | 5/1985 | Japan. |
| 60-146828 | 8/1985 | Japan. |

OTHER PUBLICATIONS

"Cholesterol-Reduced Fats: They're Here!", *Prepared Foods*, p. 99, Jul. 1989.
"New Technologies for Cholesterol Reduction", *Food Processing*, pp. 154–160, Nov. 1989.
"Cornell Unveils Commerical Process for Low-Cholesterol Milk", *Food Engineer*, pp. 172–174, May 1989.
"Microbial Elimination of Cholesterol Present in Anhydrous Milk Fat", *Int'l Conference Biotechnology and Food*, Feb. 1989.
"High Tech Lowers Dairy Cholesterol", *Food Business*, pp. 38–40, Nov. 6, 1989.

*Primary Examiner*—Jose G. Dees
*Assistant Examiner*—Deborah D. Carr
*Attorney, Agent, or Firm*—Andrew M. Solomon

[57] ABSTRACT

A process for reducing the amount of cholesterol in an edible fat capable of being solubilized comprising the steps of:
(a) providing an edible fat in a liquid state;
(b) adding an ionic salt selected from the group consisting of $CaBr_2$ and $MgBr_2$ to and edible fat;
(c) mixing said ionic salt and edible fat for a time sufficient to cause said ionic salt to react with cholesterol present in said edible fat and form a precipitate; and
(d) removing said precipitate from said mixture and the product produced by the process are disclosed. The process is capable of reducing cholesterol in edible fats by about 30% to about 100%.

14 Claims, No Drawings

REMOVAL OF CHOLESTEROL FROM EDIBLE FATS

BACKGROUND OF THE INVENTION

1. Field of the Invention

The present invention relates to the removal of cholesterol from edible fats, and more particularly, to a process for removing cholesterol by adding $MgBr_2$ or $CaBr_2$ and preferably $CaBr_2$ to melted edible fat containing cholesterol and removing the precipitate formed by the reaction of $MgBr_2$ or $CaBr_2$ with cholesterol. This process is capable of removing between about 65% and about 100% of the cholesterol originally present.

2. Description of the Prior Art

Cholesterol is a fatlike alcohol synthesized and found in all body tissues, and is an essential ingredient for certain biochemical processes, including the production of sex hormones. Although the presence of an amount of cholesterol is necessary to enable the human body to properly function, it has been hypothesized that increased amounts of cholesterol in the bloodstream can lead to atherosclerosis, causing a higher risk of heart disease. As a result, humans are attempting to maintain the amount of excess cholesterol in their bloodstream to a minimum.

A primary source of cholesterol is in food products, and in particular animal food products such as eggs, dairy products, poultry, fish, lard, and other animal fats. Due to the hypothesized risk of heart disease caused by increased cholesterol levels, humans have attempted to reduce or eliminate the consumption of these foods. Unfortunately, a large amount of cholesterol is found in many foods that are considered desirable and appetizing. Accordingly, it would be desirable to allow humans to consume these foods while maintaining the amount of cholesterol ingested to a minimum.

Attempts have been made in the art to reduce the amount of cholesterol in cholesterol containing foods.

A first method for reducing the amount of cholesterol in foods is by using a procedure known as steam-stripping. This technology is described in greater detail in *Prepared Foods*, p.99, July 1989. This process involves cascading the product in a falling film down a series of plate and ring-type heat exchange components as it is heated under vacuum by countercurrent steam to about 430°–550° C. Under these conditions, the cholesterol component is extracted by flash vaporization and is carried away in rising steam to condensers. This process is being practiced by OmegaSource Corp. of Minneapolis, Minn. While this process is capable of removing significant amounts of cholesterol from edible fats, it is disadvantageous as it is not "specific" to cholesterol, thereby causing colors and flavors to be removed along with the cholesterol removed. Accordingly, to produce a final product, these components must be re-added to the fat composition.

Another method for removing cholesterol from edible fats is to extract the cholesterol containing fat with super-critical carbon dioxide. This technology is described in greater detail in *Food Processing*, pp. 154–160, November 1989, and in *Food Engineering*, pp. 172–174, May 1989. This technology is being practiced by Phasex Corp. of Lawrence, Mass. This process is disadvantageous as it is extremely costly to implement on a commercial scale.

A further method for removing cholesterol comprises utilizing a charcoal adsorption process wherein the fat is passed through a bed of charcoal which functions as an adsorbent material. This technology is described in greater detail in EP 0 174 848.

Still another method for removing cholesterol is to add enzymes or microorganisms to the fat to convert the cholesterol to another compound. Examples of this are set forth in Japan Publication No. 60-18375, and in Chosson et al., "Microbial Elimination of Cholesterol Present in Anhydrous Milk Fat", Int'l Conference Biotechnology and Food, 1989. This process is disadvantageous as there is no guarantee that the product synthesized by the enzyme or microorganism will be safe.

EP 0 256 911 eliminates cholesterol contained in a fatty material by adding cyclodextrins to the fatty material, followed by phase separation. This process is disadvantageous in that it is not specific and will also remove color and flavors from the fatty material.

SUMMARY OF THE INVENTION

In accordance with the present invention a process for reducing the amount of cholesterol in edible fats has been developed. More particularly, the inventors have discovered that by adding a salt including a metal, preferably an alkaline earth metal to the edible fat, a precipitate which effectively separates a portion of the cholesterol originally present forms. By removing the precipitate, the resulting material has a reduced amount of cholesterol.

Thus, one embodiment of the present invention resides in a process for reducing the amount of cholesterol in an edible fat capable of being solubilized. The process comprises the steps of:

(a) providing a cholesterol containing edible fat in a liquid state;

(b) adding an ionic salt selected from the group consisting of $CaBr_2$ and $MgBr_2$ to said edible fat;

(c) mixing said ionic salt and edible fat for a time sufficient to cause said ionic salt to react with cholesterol present in said edible fat and form a precipitate; and (d) removing said precipitate from said mixture.

In a particularly preferred embodiment, the ionic salt comprises $CaBr_2$, the edible fat comprises butter fat, and the molar amount of $CaBr_2$ added is greater than or equal to the molar amount of cholesterol initially present. In other embodiments, the edible fat may be diluted with an organic solvent prior to addition of the ionic salt, a sterol other than cholesterol can be added to the fat in addition to the ionic salt, and the final product may be chemically and/or physically treated to remove remaining residual bromine.

In still another embodiment, a composition having reduced cholesterol is provided. The composition comprises the product of the above-described process. The composition may be used in edible foods such as ice cream, sour cream, flavored and unflavored milks, salad dressings and the like.

Accordingly, it is an object of the present invention to provide a process for reducing the amount of cholesterol in edible fats capable of being solubilized.

Another object of the present invention is to provide a process for reducing the amount of cholesterol in edible fats wherein amounts of other components of the fat, such as vitamins, color and flavors are not significantly reduced.

A further object of the present invention is to provide an edible fat having a reduced amount of cholesterol while maintaining a similar color and flavor.

These, and other objects will readily be apparent to those skilled in the art as reference is made to the detailed description of the preferred embodiment.

DETAILED DESCRIPTION OF THE PREFERRED EMBODIMENT

When describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention provides a process for reducing the amount of cholesterol in an edible fat capable of being solubilized. The process can be utilized to reduce the amount of cholesterol initially present by about 30% to about 100% percent, and more preferably by about 65% to about 100%.

The first step of the process comprises providing an edible fat capable of being solubilized in a liquid state. This is typically accomplished by melting the fat if it is a solid at room temperature. Examples of edible fats which may be utilized in accordance with the present invention include butter fat, beef tallow, fish oil and egg yolks. The process of the present invention provides particularly good results in reducing the amount of cholesterol in butter fat (also known as milk fat or butter oil).

For some applications it may desirable to dilute the edible fat with an organic solvent prior to addition of the ionic salt. The key criterion for solvent selection is that the edible fat be miscible with the solvent. Examples of suitable solvents include n-hexane, diethylether, methyl-tert-butylether and ethyl-tertbutylether. In practice, the solvent is added in amount ranging from about 100 to about 10,000 parts per 100 parts of edible fat.

After the edible fat or fat/solvent mixture has been provided in a liquid state, an amount of either $CaBr_2$ or $MgBr_2$, and preferably $CaBr_2$ is added to form a mixture, and the mixture is mixed for a time period sufficient to cause the formation of a precipitate. $CaBr_2$ can generally remove up to about 75% of cholesterol initially present whereas $MgBr_2$ can generally remove up to about 35% of cholesterol initially present. While not wishing to be bound by any scientific theory, it is hypothesized that the precipitate is an complex of the alkaline earth metal of the metal salt and cholesterol. While not specifically tested, other salts believed to work include $CaCl_2$, $MgCl_2$, LiBr, LiCl, $ZnBr_2$ and $ZnCl_2$.

The amount of the ionic salt added comprises an amount sufficient to form the cholesterol reducing precipitate. In practice, the ionic salt is preferably added in a molar amount of at least the molar amount of cholesterol initially present, and more preferably in an amount ranging from between about 2.0 moles and about 10.0 moles salt per mole of cholesterol initially present.

When adding $CaBr_2$ to the fat, it can typically reduce the cholesterol content by up to about 75% of the amount initially present. To increase the amount removed to levels exceeding 75%, for example up to about 100%, a small amount of a sterol other than cholesterol may be added along with the ionic salt. Examples of sterols which may be added included sitosterol, Vitamin D and campesterol, with sitosterol being a particularly effective additive. The amount of sterol added to the melted fat typically ranges from about 1.5 to about 6.0 parts sterol per 1000 parts fat. While not specifically tested, it is thought that the addition of a plant sterol will provide improved results when used in combination with other ionic salts.

In practice, the amount of cholesterol reduced from the edible fat is directly proportional to the speed and time of mixing the ionic salt into the liquid fat (i.e. high speed mixing for extended periods of time leads to higher cholesterol reduction). Typical mixing rates range between about 250 rpm and about 500 rpm, while typical mixing times range between about 0.5 hours and about 10.0 hours. Those skilled in the art will readily recognize that a desired amount of cholesterol can be reduced by optimizing the mixing rate and mixing time. It has further been discovered that the presence of additive plant sterols in the mixture, such as sitosterol, can lead to a reduction in mixing time.

After the precipitate has fully formed in the fat/ionic salt mixture, it is separated and removed by methods well known in the art such as filtering, certrifuging and the like. In practice, certrifuging at a rate of about $5000 \times g$ produces satisfactory results. When certrifuging, the supernatant comprises the reduced cholesterol fat and is easily fractioned from the solid precipitate. If the fat is mixed with a solvent prior to salt addition, the solvent is removed by methods known in the art such as flash evaporation.

After the cholesterol reduced fat has been isolated from the precipitate, it may used in the preparation of foods such as ice cream, sour cream, and the like. However, if residual bromine remains in the fat it may be desirable to remove the bromine before the fat is used to prepare such foods. At least two methods may be used to remove the bromine.

In the first method, a small amount of water, typically between about 5% and about 15% by volume of fat is added to the liquid fat, the mixture is shaken or stirred for a period of time sufficient to form a bromine complex precipitate, and the precipitate is isolated from the fat, typically by centrifuging. When centrifuging, the supernatant comprises the final cholesterol reduced fat.

When isolating the bromine from the fat by using the above water extraction, a loss in the yield of fat recovered may occur. It is hypothesized that a slight portion of the fat may attach to the bromine complex precipitate. To minimize the amount of fat lost during the extraction process, a small amount of a water soluble salt should be added to the water used for extraction. Examples of suitable salts include NaCl and $CaCl_2$, with NaCl being particular preferred. The amount of salt typically added comprises between about 5 and about 30 parts per 100 parts water added.

Alternatively, the residual bromine may be removed from the cholesterol reduced fat by contacting the fat with a food-grade anion-exchange resin such that the bromine binds to the resin, and subsequently isolating the fat from the resin. An example of a suitable resin is Amberlite IRA-900, manufactured by Rohm & Haas Chemical Co. When using this method to remove bromine, the resin is typically added to the liquid fat in an amount ranging between about 10 and about 20 grams of resin per kilogram of fat, the mixture is shaken or stirred for a period of time sufficient to enable the bromine to bind to the resin, and the mixture is certrifuged to isolate the bromine-bound resin from the cholesterol reduced fat.

In comparison to prior art methods for removing cholesterol, the present method is particularly beneficial as it is specific to removing cholesterol. Accordingly, other elements of the fat, such as vitamins, nutrients, flavors and color are not removed in significant amounts during the cholesterol reduction process. As these elements do not have to be re-added to the fat after cholesterol reduction, a particularly cost efficient process, is achieved.

The invention is described in greater detail by the following non-limiting examples.

EXAMPLE 1

To reduce the amount of cholesterol in anhydrous butter fat 1000 parts of anhydrous butter fat were heated to 43° C. to form a molten liquid. The cholesterol content of the butter fat was 2.61 g/kg fat. 3.6 parts of $CaBr_2$ were added to the molten fat and the mixture was shaken at 350 r.p.m. at 43° C. for 1.5 hours. The mixture was then centrifuged for five minutes (5000×g) to isolate the precipitate from the supernatant. The amount of cholesterol measured in the supernatant was 0.95 grams, resulting in a cholesterol reduction of 63.6%. To remove residual bromine from the supernatant, 100 parts of water were added to the molten fat, the mixture was shaken (350 r.p.m.) at 43° C. for 30 minutes, centrifuged for 5 minutes (5000×g) and the supernatant was removed. The yield of butter fat was 90%. The sample was also tested for retention of Vitamins A, D, and E. The composition retained 94% of Vitamin A originally present, 88% of Vitamin D originally present and 71% of Vitamin E originally present.

EXAMPLE 2

The experiment of Example 1 was repeated except that 2.9 parts of sitosterol were added to the molten butter fat along with the $CaBr_2$. The amount of cholesterol measured in the supernatant was 0.39 grams, resulting in a reduction in cholesterol of 85%. In addition, 10 parts of NaCl were added to the water used for removing residual bromine. The yield of butter fat was 95%.

EXAMPLE 3

The experiment of Example 2 was repeated except that 7.2 parts of $CaBr_2$ were initially added. The amount of cholesterol measured in the supernatant was 0.26 grams, resulting in a reduction of cholesterol of 90%.

EXAMPLE 4

The experiment of Example 1 was repeated except that the residual bromine was removed by adding 15 parts of Amberlite IRA-900, a food-grade anion-exchange resin manufactured by the Rohm & Haas Company to the mixture, shaking the mixture at 43° C. for 30 minutes (350 r.p.m.) and centrifuging at 5000×g for five minutes. The yield of butter fat was 93%.

EXAMPLE 5

Production of Chocolate Milk

To produce chocolate milk according to recognized food specifications (3.25% milkfat, 9.0% milk solids nonfat, 250 grams (1 cup)), the following formulation was prepared as a control:

| Ingredient | Control grams | mg cholesterol |
| --- | --- | --- |
| Fluid Skim Milk | 213 | 3.5 |
| Nonfat Dry Milk | 3.1 | 0.6 |
| Cream (44% fat) | 16.9 | 23.6 |
| Stabilizer (FMC Seakem CM-611) | 0.08 | 0.0 |
| Cocoa (Dezann Inc. D-11-MC) | 2.5 | 0.0 |
| Sucrose | 15 | 0.0 |
| TOTAL | 250.6 | 27.7 |

By comparison, chocolate milk using the composition of Example 3 was prepared according to the above specifications. The chocolate milk had the following formulation:

| Ingredient | Inventive Formulation grams | mg cholesterol |
| --- | --- | --- |
| Fluid Skim Milk | 221 | 3.6 |
| Nonfat Dry Milk | 3.1 | 0.6 |
| Composition of Example 3 | 7.4 | 1.9 |
| FMC Seakem CM-611 | 0.08 | 0.0 |
| Cocoa (Dezann Inc. D-11-MC) | 2.5 | 0.0 |
| Sucrose | 15 | 0.0 |
| TOTAL | 249.1 | 6.1 |

The formulation according to the present invention had 78% lower cholesterol than the control.

EXAMPLE 6

Production of Vanilla Ice Cream

To produce vanilla ice cream according to recognized food specifications (10.0% milkfat, 11.5% milk solids notfat, 8 ounces (133 grams)) the following formulation was prepared as a control:

| Ingredient | Control grams | mg cholesterol |
| --- | --- | --- |
| Fluid Skim milk | 74.7 | 1.2 |
| Nonfat Dry Milk | 7.5 | 1.5 |
| Cream (44% fat) | 29.7 | 41.6 |
| Emulsifier (Durkee #2 Ice Beads) | 0.4 | 0.0 |
| Sucrose | 20.0 | 0.0 |
| Vanilla flavor (Neilson-Massey, 2-fold) | 0.7 | 0.0 |
| TOTAL | 133.0 | 44.3 |

By comparison, vanilla ice cream using the composition of Example 2 was prepared according to the above specifications. The vanilla ice cream had the following formulation.

| Ingredient | Inventive Formulation grams | mg cholesterol |
| --- | --- | --- |
| Fluid Skim Milk | 91.4 | 1.5 |
| Nonfat Skim milk | 7.6 | 1.5 |
| Composition of Example 2 | 13.0 | 5.1 |
| Durkee #2 Ice Beads | 0.4 | 0.0 |
| Sucrose | 20.0 | 0.0 |
| Vanilla flavor (Neilson-Massey, 2-fold) | 0.7 | 0.0 |
| TOTAL | 133.1 | 8.1 |

The formulation according to the present invention had 82% lower cholesterol than the control.

EXAMPLE 7

Production of Sour Cream

To produce sour cream according to recognized food specifications (21% fat, 12 g=1 tbsp) the following formulation was prepared as a control:

| Ingredient | Control grams | mg cholesterol |
|---|---|---|
| Fluid Skim Milk | 6.88 | 0.11 |
| Nonfat Dry Milk | 0.24 | 0.05 |
| Cream (44% fat) | 4.87 | 6.80 |
| Sodium Citrate | 0.012 | 0.00 |
| TOTAL | 12.00 | 7.0 |

By comparison, sour cream using the cholesterol reduced butter fat of Example 3 was produced. The sour cream had the following formulation:

| Ingredient | Inventive Forumulation grams | mg cholesterol |
|---|---|---|
| Fluid Skim Milk | 9.60 | 0.16 |
| Nonfat Dry Milk | 0.24 | 0.05 |
| Composition of Example 3 | 2.14 | 0.58 |
| Sodium Citrate | 0.012 | 0.00 |
| TOTAL | 11.99 | 0.77 |

The formulation according to the present invention had 89% lower cholesterol than the control.

Having described the invention in detail and by reference to the preferred embodiments thereof, it will be apparent that modifications and variations are possible without departing from the scope of the appended claims.

What is claimed is:

1. A process for reducing the amount of cholesterol in an edible fat capable of being solubilized comprising the steps of:
   (a) providing a cholesterol containing edible fat in a liquid state;
   (b) adding an ionic salt selected from the group consisting of $CaBr_2$ and $MgBr_2$ to said edible fat;
   (c) mixing said ionic salt and edible fat for a time sufficient to cause said ionic salt to react with cholesterol present in said edible fat and form a precipitate: and
   (d) removing said precipitate from said mixture.

2. The process according to claim 1 wherein said ionic salt is added in a molar amount of at least the molar amount of cholesterol present in said edible fat.

3. The process according to claim 2 wherein said edible fat is selected from the group consisting of butter fat, beef tallow, fish oils and egg yolk.

4. The process according to claim 3 wherein said ionic salt comprises $CaBr_2$.

5. The process according to claim 4 wherein said edible fat comprises butter fat.

6. The process according to claim 4 comprising the additional step of adding a sterol other than cholesterol to said liquid fat, said sterol addition step occurring prior to step (c).

7. The process according to claim 6 wherein said sterol comprises sitosterol.

8. The process according to claim 3 comprising the additional step of removing residual bromine from said cholesterol reduced edible fat, said removing step occurring after step (d).

9. The process according to claim 8 wherein said removing residual bromine step comprises extracting said cholesterol reduced edible fat with water to form a bromine complex precipitate in said water and discarding said bromine complex precipitate and said water.

10. The process according to claim 9 comprising the additional step of adding a water soluble salt to said water used for said extracting step.

11. The process according to claim 10 wherein said water soluble salt comprises NaCl.

12. The process according to claim 8 wherein said removing residual bromine step comprises contacting said cholesterol reduced edible fat with an anion exchange resin to complex said residual bromine to said anion exchange resin and removing said anion exchange resin from said cholesterol reduced edible fat.

13. The process according to claim 2 comprising the additional steps of diluting said edible fat with an organic solvent, said diluting step occurring prior to step (b); and removing said organic solvent from said mixture, said removing step occurring after step (d).

14. The process according to claim 13 wherein said solvent is selected from the group consisting of n-hexane, diethylether, methyl-t-butylether and ethyl-t-butylether.

* * * * *